(12) United States Patent
Takahashi et al.

(10) Patent No.: US 6,293,396 B1
(45) Date of Patent: Sep. 25, 2001

(54) CONTAINER FOR DISK (75) Inventors: Hitoshi Takahashi; Shigeru Okai, both of Mito (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/620,571

(22) Filed: Jul. 20, 2000

(30) Foreign Application Priority Data

May 30, 2000 (JP) .................................................. 12-159808

(51) Int. Cl.[7] .................................................... B65D 85/57
(52) U.S. Cl. ........................................ 206/310; 206/308.1
(58) Field of Search .............................. 206/308.1, 309, 206/310–313, 232, 493

(56) References Cited

U.S. PATENT DOCUMENTS

| 5,101,971 | 4/1992 | Grobecker . | |
|---|---|---|---|
| 5,251,750 | 10/1993 | Gelardi et al. . | |
| 5,788,068 | 8/1998 | Fraser et al. . | |
| 6,085,900 | * 7/2000 | Wong | 206/308.1 |
| 6,123,192 | * 9/2000 | Rufo, Jr. | 206/310 |
| 6,164,446 | * 12/2000 | Law | 206/308.1 |
| 6,196,384 | * 3/2001 | Belden, Jr. | 206/308.1 |
| 6,206,185 | * 3/2001 | Ke et al. | 206/310 |

* cited by examiner

Primary Examiner—Luan K. Bui
(74) Attorney, Agent, or Firm—Connolly Bove Lodge & Hutz (57) ABSTRACT

The container 200 for a disk comprises the cover section 110, the tray section 220 and the spine section 280, wherein the cover section 110 and the tray section 220 are provided on both sides of the spine section 280 and they can be opened and/or closed freely. The container 200 further comprises the engaging section 130 provided on the tray section 220, which engages with the center hole 501 of the disk 500 contained in the container 200 and holds the disk 500 so as to load and remove freely. The engaging section 130 comprises the table 160 in a "C", shape, a plurality of ribs 151 and the fastening section 140. Further, the spine section 280 is composed of the tongue 281 for protecting a disk from dropping off.

3 Claims, 12 Drawing Sheets

CONTAINER FOR DISK

BACKGROUND OF THE INVENTION

1. Field of the Invention

The present invention relates to a container for a disk, which contains a disk for recording a data signal such as audio and video, particularly, relates to a container having a mechanism of being able to hold an optical disk having a center hole securely and able to remove the disk from and insert the disk into the container easily.

2. Description of the Related Art

Currently, two major types of containers, which contain a disk such as a digital versatile disk (DVD) of recording a large capacity of audio and video information, are utilized. One of the containers is a parallelpipedic case for a compact disk (CD). A shape of disks other than a CD disk such as a DVD disk is identical with that of a CD disk, so that a constitution of such a parallelpipedic case for a CD disk is applied to a container for other disks than a CD disk.

However, it is hard to distinguish such a parallelpipedic case from that for a CD disk. Further, in a case of recording a movie, such a parallelpipedic case is small in dimension, so that a jacket or booklet introducing its contents is restricted dimensionally. Accordingly, a container dimensionally similar to a container for video software containing one videotape is also utilized.

It is important for this kind of container how to remove a disk from the container easily. Since a standard diameter of a disk is rather large such as 120 mm, it is hard for a person such as a child having smaller hands to handle such a disk. In a case of a disk such as a DVD disk, it is necessary for a DVD disk to increase a recording capacity in comparison with that of a CD disk. Therefore, some DVD disks adopt a construction of sticking two disks together. Further, a fastening and a removing means, which can release excessive stress to a DVD disk so as to prevent the DVD disk from peeling off, are required.

There provided various kinds of containers for a disk, which can hold a disk securely and assure easy removal of the disk when the disk is taken out from the container. U.S. Pat. Nos. 5,788,068 and 5,101,971 disclose the container for a disk.

According to U.S. Pat. No. 5,101,971, a container having a circumferential rib, which is divided into 9 pieces so as to coincide with a center hole of a disk, is provided. An outer diameter of the tip of the rib is designated to be slightly larger than the inner diameter of the center hole of a disk, so that the disk can be held securely and removed easily by using a spring effect of the circumferential rib. If engagement between the center hole of a disk and the rib is set for loosening so as to release the disk from overloading, the disk can easily be removed from the rib in the container. Accordingly, the disk moves freely inside the container and a surface of the disk recorded with a signal may be scratched. On the other hand, if the engagement is set for tightening not so as for the disk to come off, the disk can hardly be inserted or removed. Accordingly, the disk may be damaged when the disk is forced to be inserted or removed. In some cases, a signal recorded in the scratched disk or the damaged disk can be hardly reproduced due to scratches or damage.

SUMMARY OF THE INVENTION

Accordingly, in consideration of the above-mentioned problem of the prior art, an object of the present invention is to provide a container for a disk, which can hold an optical disk having a center hole securely and assure easy removal of the disk from the container and easy insertion of the disk into the container.

In order to achieve the above object, the present invention provides a container for a disk comprising: a spine section; a cover section provided on one side of the spine section so as to be able to be closed and opened freely; and a tray section provided on another side of the spine section so as to be able to be closed and opened freely, wherein said tray section is provided with an engaging section for engaging with a center hole of a disk, and wherein the engaging section engages with and holds the disk so as to load and release the disk freely, the engaging section further comprising: a C-shaped table portion for supporting the disk in a predetermined height; a cylindrical rib composed of a plurality of ribs provided on the C-shaped table portion with respectively contacting with an inner wall of a center hole of the disk supported by the C-shaped table portion; and a fastening section composed of a lip shaped portion, which presses down and fastens the disk supported by the C-shaped table portion after the lip shaped portion passes through the center hole of the disk, a push button shaped portion of releasing the disk from an engagement with said lip shaped portion pressing down and fastening the disk and an arm portion having elasticity, which is provided on the tray section.

According to another aspect of the present invention, there provided a container for a disk comprising: a spine section; a cover section provided on one side of the spine section so as to be able to be closed and opened freely; and a tray section provided on another side of the spine section so as to be able to be closed and opened freely, wherein the tray section is provided with an engaging section for engaging with a center hole of a disk, and wherein the engaging section engages with and holds the disk so as to load and release the disk freely, the engaging section further comprising: a C-shaped table portion for supporting the disk in a predetermined height; a cylindrical rib composed of a plurality of ribs provided on the C-shaped table portion with respectively contacting with an inner wall of a center hole of the disk supported by the C-shaped table portion; and a fastening section composed of a lip shaped portion, which presses down and fastens the disk supported by said C-shaped table portion after the lip shaped portion passes through the center hole of the disk, a push button shaped portion of releasing the disk from an engagement with said lip shaped portion pressing down and fastening the disk and an arm portion having elasticity, which is provided on the tray section, and the spine section further comprising a tongue shaped section for protecting the disk from accidentally dropping off, which is projected on the spine section with allocating so as to approach an upper surface of the disk when the container is closed after the disk is engaged with the engaging section, and the engaging section is further characterized by that the engaging section is formed so as for the tongue shaped section and the C-shaped table portion to face each other.

Other object and further features of the present invention will be apparent from the following detailed description when read in conjunction with the accompanying drawings.

DETAILED DESCRIPTION OF THE PREFERRED EMBODIMENTS

First Embodiment

Figure 1:
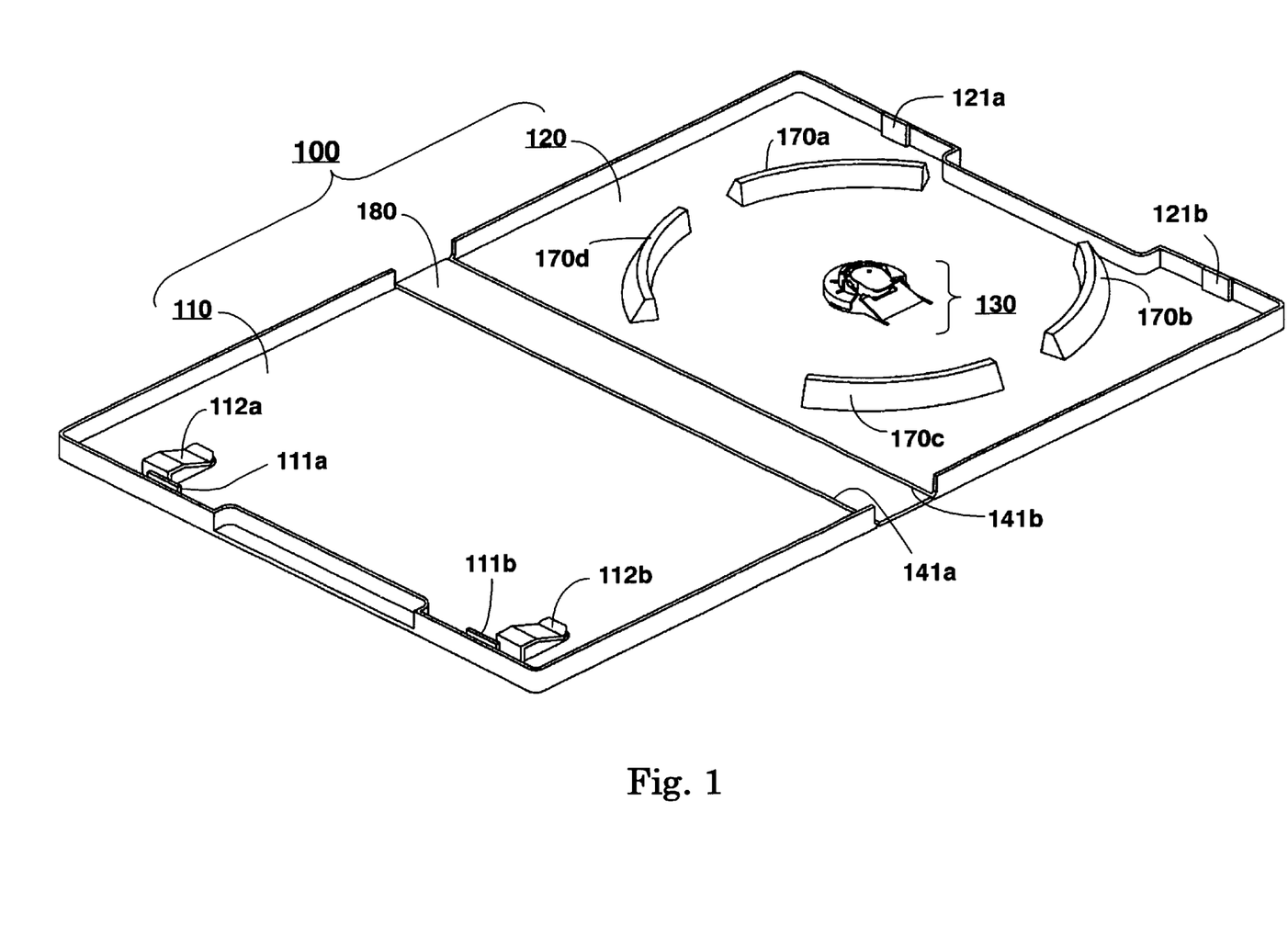
FIG. 1 is a perspective view of a container for a disk with opening the container flat according to a first embodiment of the present invention.

FIG. 1 is a perspective view of a container for a disk with opening the container flat according to a first embodiment of the present invention.

As shown in FIG. 1, a container 100 for a disk comprises a cover section 110, a tray section 120 and a spine section 180, which joints the cover section 110 and the tray section 120, wherein they are molded in one piece. There provided two hinge sections 141a and 141b on the both side of the spine section 180: one hinge section 141a is connected to the cover section 110 and the other hinge section 141b is connected to the tray section 120. These hinge sections 141a and 141b are bent so as to face the cover section 110 and the tray section 120 each other and they are engaged. Accordingly, one container is formed.

There provided two pairs of snap hooks 111a–121a and 111b–121b: two snap hooks 111a and 111b are provided on the cover section 110 and two snap hooks 121a and 121b are provided on the tray section 120. The snap hooks 111a and 111b are engaged with the snap hooks 121a and 121b respectively when the hinge sections 141a and 141b are bent to form one container, so that the container 100 is prevented from accidental opening by elasticity of the hinge sections 141a and 141b.

There provided two arms 112a and 112b projecting inside the cover section 110. A booklet, not shown, describing how to use a contents information recorded in a disk and an explanation is inserted into the arms 112a and 112b in addition to the disk essentially contained in the container 100.

An engaging section 130 for fastening a disk securely and four disk protection ribs 170, which are allocated in an outermost circumference area of a disk to protect the disk contained in the container 100, are provided on the tray section 120. Each disk protection rib 170 is provided for protecting an outer circumference of a disk from damage when external force is accidentally applied to the disk contained in the container 100 in the radial direction of the disk or when the container 100 containing the disk is accidentally dropped. They are not provided for holding or sustaining a disk in a predetermined height.

Figure 6:
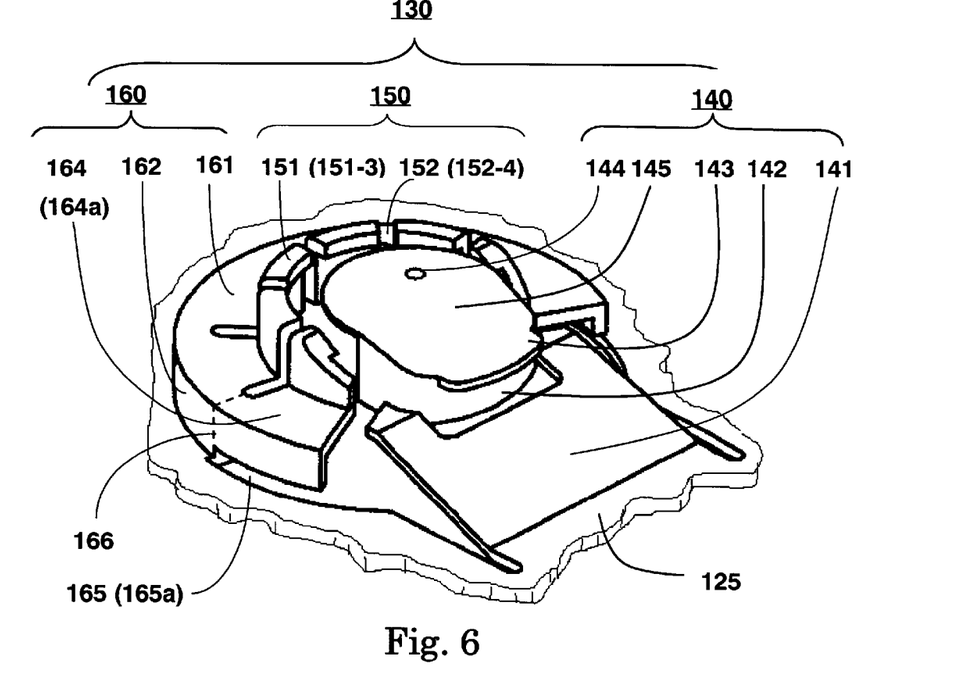
FIG. 6 is an enlarged perspective view of an engaging section of a container for a disk according to the present invention.

FIG. 6 is an enlarged perspective view of an engaging section of a disk container according to the present invention.

Figure 7:
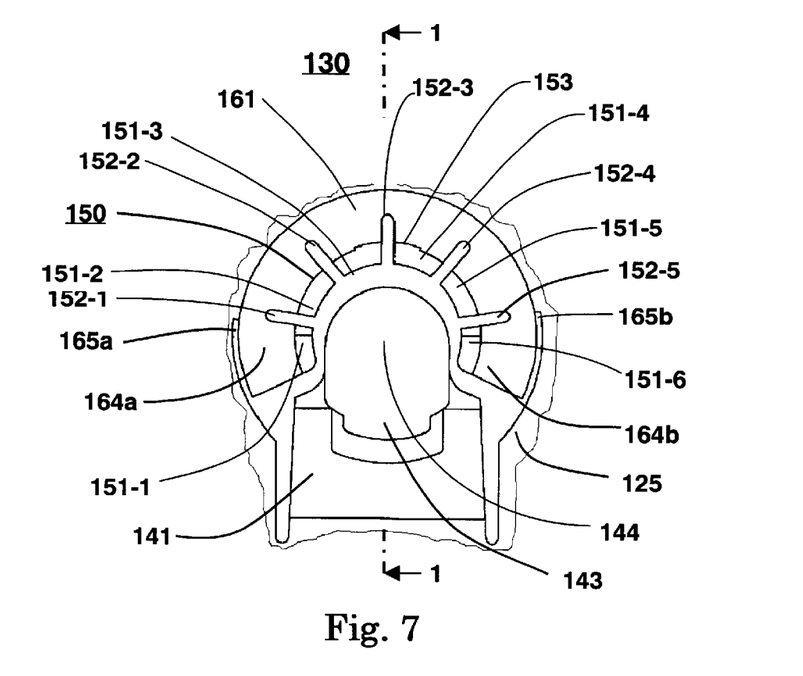
FIG. 7 is an enlarged plan view of the engaging section shown in FIG. 6.

FIG. 7 is an enlarged plan view of the engaging section shown in FIG. 6.

Figure 8:
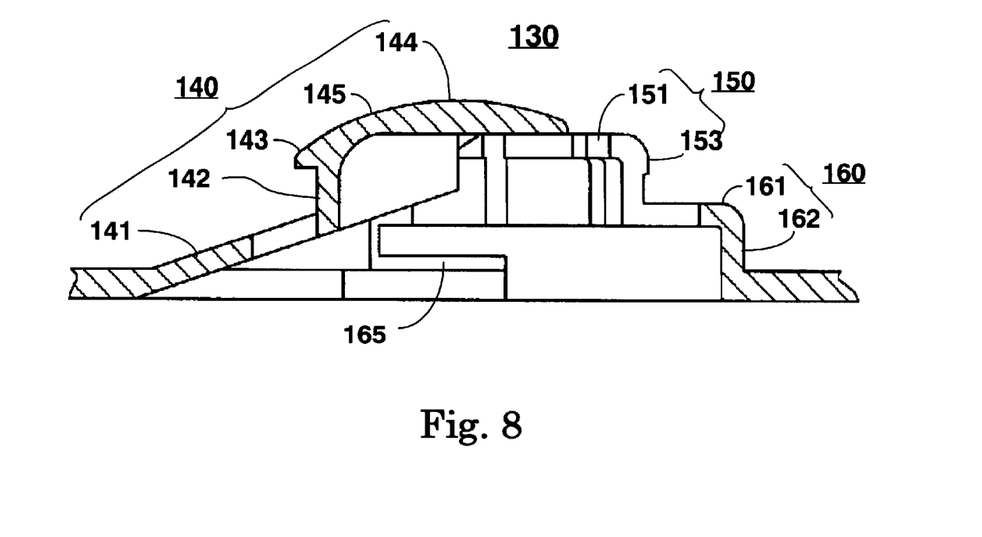
FIG. 8 is an enlarged cross sectional view taken substantially along line 1—1 of FIG. 7 showing a shape of the engaging section shown in FIG. 6.

FIG. 8 is an enlarged cross sectional view taken substantially along line 1—1 of FIG. 7 showing a shape of the engaging section shown in FIG. 6.

As shown in FIGS. 6 and 8, the engaging section 130 comprises a fastening section 140 utilized for fastening and removing a disk, a cylindrical rib 150, which is divided into a plurality of sections for holding a disk together with the fastening section 140, and a table 160 allocated at the bottom of the cylindrical rib 150 for sustaining the disk in a predetermined height.

The fastening section 140 constituting the engaging section 130 comprises an arm 141, which elongates upward from an bottom plate 125 of the tray section 120 inside the container 100, a vertical plane 142, which rises vertically above the bottom plate 125 and is engaged loosely with an inner wall of a center hole of a disk, a lip 143, which is formed continuously as a series of the vertical plane 142 and presses down the disk at a vicinity of the center hole, a button shaped section 144, which is pressed down to remove the disk, and an inclined plane 145, which is a series of plane from the button shaped section 144 to the lip 143. The fastening section 140 is formed such that the button shaped section 144 can come into an inner circumference area of the cylindrical rib 150 and the arm 141 can also come into a space adjacent to the table 160 as shown in FIGS. 6 and 7.

The table 160 constituting the engaging section 130 is formed like an arc such as a letter "C" and comprises a flat section 161, which is provided on a top surface of the table 160 above the bottom plate 125 and supports a bottom surface of a disk, and a wall 162. There provided a pair of notches 165 (165a, 165b) on a connecting section between the wall 162 of the table 160 and the bottom plate 125 at the both ends of the connecting section near the arm 141. In addition thereto, as shown in FIG. 7, there provided 2 notches 165a and 165b actually.

A part of the flat section 161 above the notch 165 is not directly supported by the bottom plate 125 and it is called a non supported section 164. A top surface of the non supported section 164 is continuously connected to the surface of the flat section 161 at a jointed part 166 and a wall part of the non supported section 164 is also continuously connected to the wall 162 at the jointed part 166. If the button shaped section 144 is pressed down, pressing force is applied to the jointed part 166 through a disk held on the table 160 and elasticity deformation occurs at the jointed part 166. Accordingly, the non supported section 164 can be deflected downward.

The cylindrical rib 150 constituting the engaging section 130 is composed of a plurality of ribs 151, which are projected above the table 160 respectively and formed an arc in total like a letter "C". Grooves 152 separating each rib 151 are engraved as far as the surface of the flat section 161 of the table 160. Each rib 151 can be easily deflected toward the center direction of the cylindrical rib 150 when a disk is removed. In addition thereto, as shown in FIG. 7, total 6 ribs 151-1 through 151-6 and 5 grooves 152-1 through 152-5 are actually provided.

Figure 9:
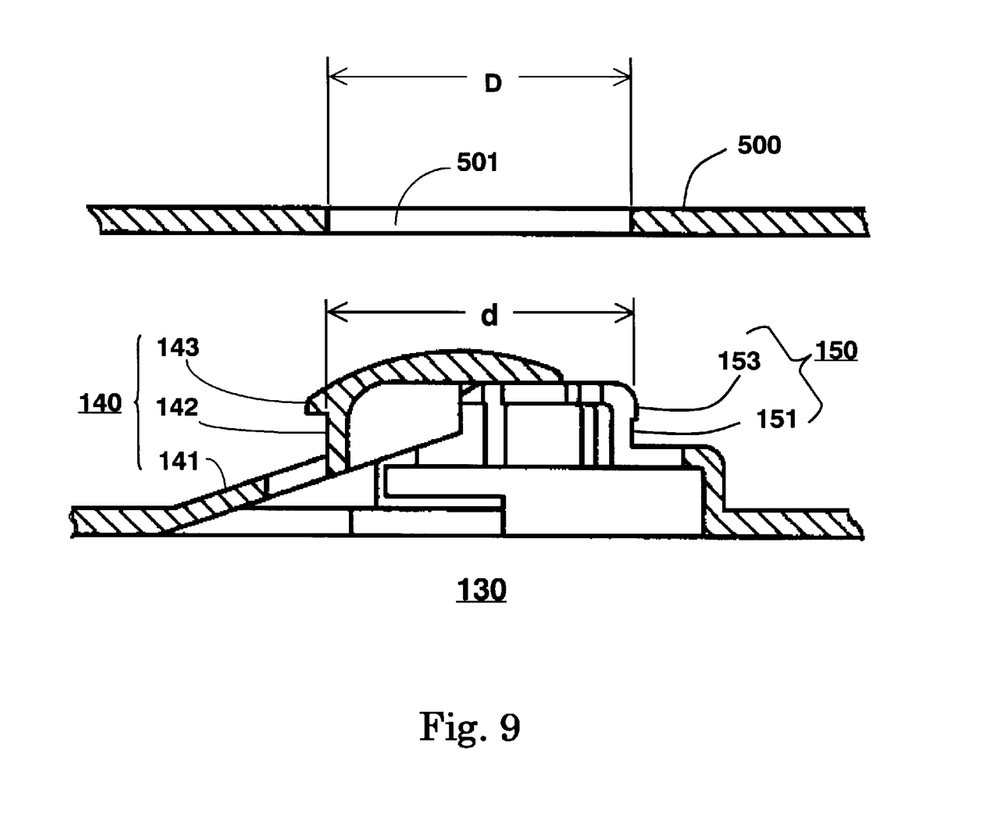
FIG. 9 is an enlarged cross sectional view, a partly schematic, showing dimensional relations between a disk and the engaging section according to the present invention.

FIG. 9 is an enlarged cross sectional view, a partly schematic, showing dimensional relations between a disk and the engaging section according to the present invention.

The cylindrical rib 150 and the vertical plane 142 of the fastening section 140 form an arc totally as shown in FIGS. 6 and 7.

Further, as shown in FIG. 9, a diameter "d" of the arc is designated so as to be approximately equal to a diameter "D" of a center hole 501 of a disk 500.

Furthermore, a projection 153 is provided on an outer circumference of ribs 151-3 and 151-4 as shown in FIGS. 7 through 9 although it is not shown in FIG. 6. The disk 500 contained in the container 100 is pressed down slightly by each projection 153 and the under side surface of the disk 500 is supported by the flat section 161. Therefore, the disk 500 is held horizontally without tilting against the bottom plate 125.

The disk 500, which is engaged and fastened by the engaging section 130, is placed on the table 160 with restricting its position by the cylindrical rib 150. Accordingly, the disk 500 is immobilized not so as to be released from the engaging section 130 in conjunction with the lip 143 of the fastening section 140 when a vibration or a shock is applied to the container 100.

Figure 10:
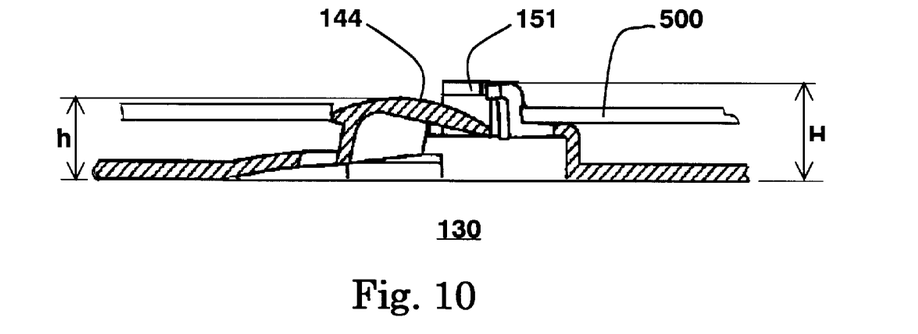
FIG. 10 is an enlarged cross sectional view showing height relationship between a cylindrical shaped rib and a button shaped section in a release position according to the present invention.

FIG. 10 is an enlarged cross sectional view showing height relationship between the cylindrical shaped rib and the button shaped section in a release position according to the present invention.

Figure 11:
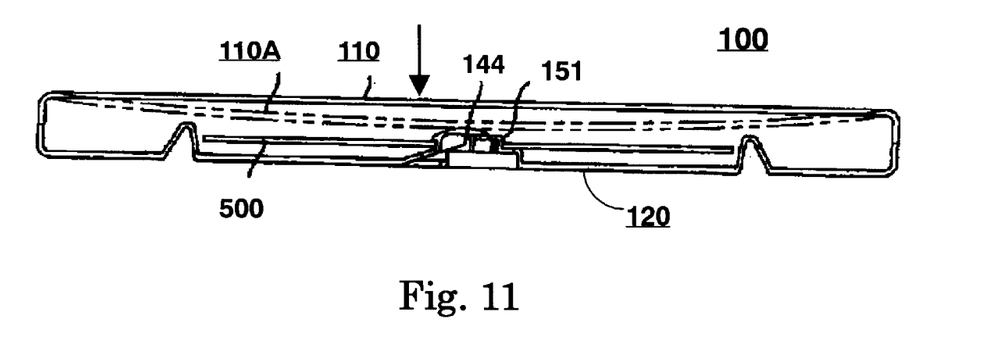
FIG. 11 is a cross sectional view of the container showing a cover of the container deformed.

FIG. 11 is a cross sectional view of the container showing a cover of the container deformed.

Figure 12:
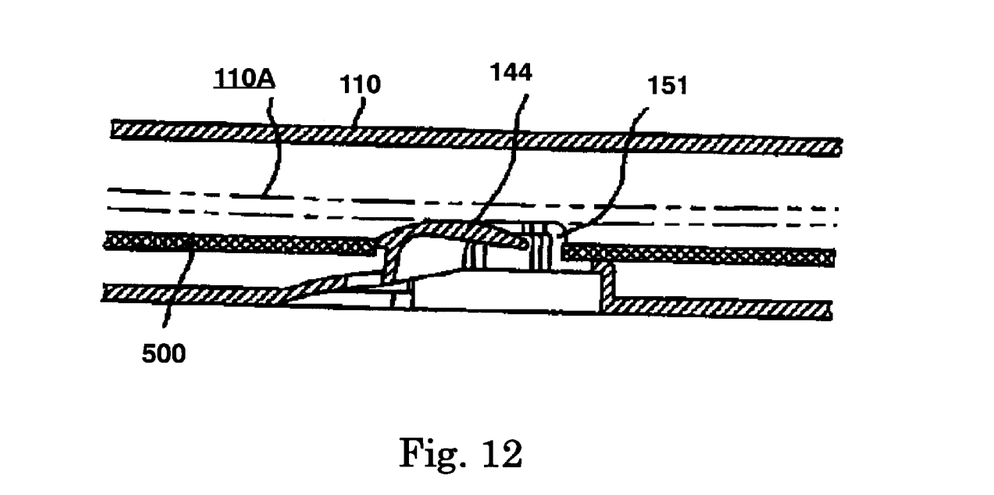
FIG. 12 is an enlarged cross sectional view, a partly schematic, showing a relationship between the cylindrical shaped rib and the button shaped section shown in FIG. 10 when the cover of the container is deformed.

FIG. 12 is an enlarged cross sectional view, a partly schematic, showing a relationship between the cylindrical shaped rib and the button shaped section shown in FIG. 10 when the cover of the container is deformed.

As shown in FIG. 10, a height "H" of each rib 151 is higher than a height "h" of the button shaped section 144 at a time when engagement between the button shaped section 144 and the disk 500 is released. As shown in FIG. 11, a deformed cover section 110A, which is an elastically deformed cover section 110, hits against the tip of each rib 151 before the button shaped section 144 is pressed down as far as a height "h" of releasing the disk 500 even though a center part of the cover section 110 is accidentally pressed down toward the engaging section 130 when the container 100 is held firmly by hands. Therefore, the deformed cover section 110A will not be deformed downward or toward the bottom plate 125 any more as shown in FIG. 12.

Accordingly, the disk 500, which is engaged with and fastened to the engaging section 130, is never released from the engaging section 130 although the deformed cover section 110A accidentally presses down the button shaped section 144, because the button shaped section 144 will not be pressed down to the releasing point of a disk. In addition thereto, a disk contained in the container 100 is never released even though pushing force, which is equivalent to that of applied to the cover section 110 mentioned above, is applied to both the cover section 110 and the tray section 120 or applied to only the tray section 120.

Figure 13:
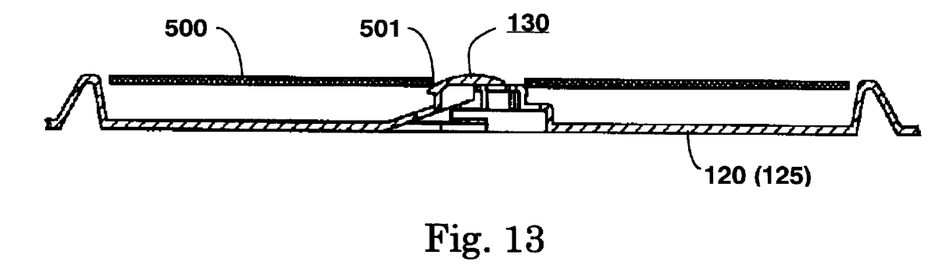
FIG. 13 is a cross sectional view showing a first stage of loading a disk into a container according to the present invention.

FIG. 13 is a cross sectional view showing a first stage of loading a disk into the container according to the first embodiment of the present invention.

Figure 14:
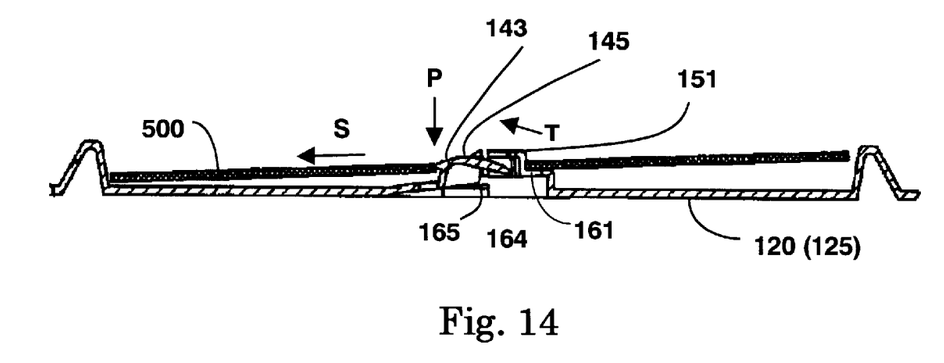
FIG. 14 is a cross sectional view showing an intermediate position of the disk while loading the disk into the container.

FIG. 14 is a cross sectional view showing an intermediate position of the disk while loading the disk into the container.

Figure 15:
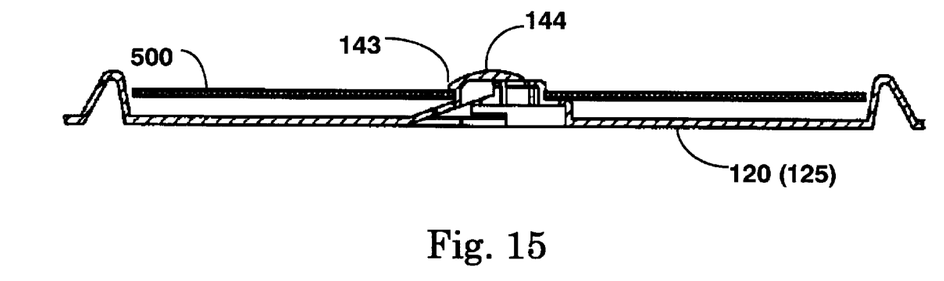
FIG. 15 is a cross sectional view when the disk is loaded completely in the container, while the disk is properly engaged with the engaging section.

FIG. 15 is a cross sectional view when the disk is loaded completely in the container.

Figure 16:
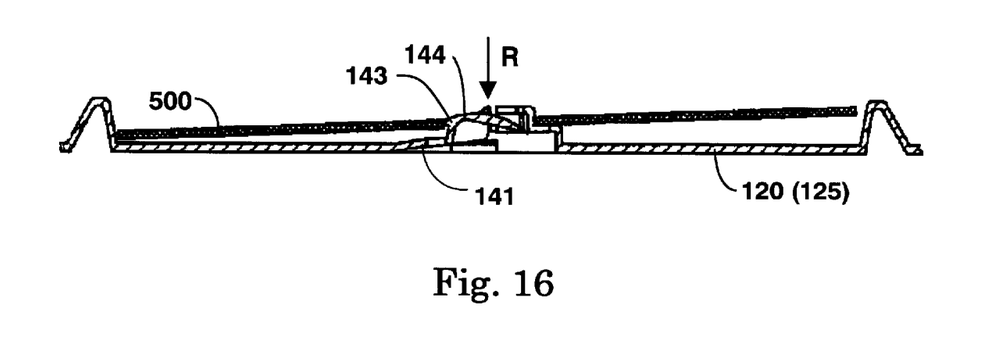
FIG. 16 is a cross sectional view showing a first stage of removing a disk from the container.

FIG. 16 is a cross sectional view showing a first stage of removing a disk from the container.

Figure 17:
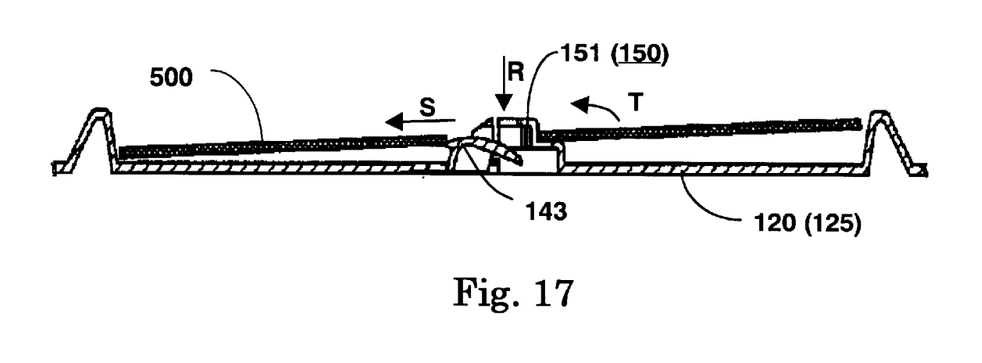
FIG. 17 is a cross sectional view showing an intermediate status of the disk while removing the disk.

FIG. 17 is a cross sectional view showing an intermediate status of the disk while removing the disk.

Figure 18:
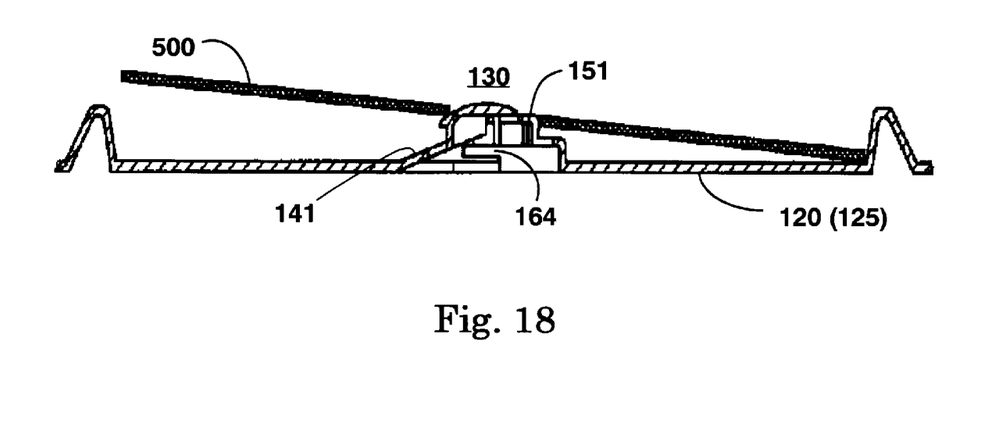
FIG. 18 is a cross sectional view when the disk is released completely from the engaging section.

FIG. 18 is a cross sectional view when the disk is removed completely from the container.

As shown in FIG. 13, when the disk 500 is loaded into the container 100, the disk 500 is placed on the engaging section 130 so as for the center hole 501 of the disk 500 to approximately coincide with the engaging section 130. Then a vicinity of the center hole 501 of the disk 500 is pressed down with applying a force "P" as shown in FIG. 14. In order to engage and fasten the disk 500 securely with utilizing deflection of the non supported section 164 having the notch 165 mentioned above while containing the disk 500 in the container 100, the force "P" is desired to be applied to an area facing toward the lip 143 of the fastening section 140 or opposite to the cylindrical rib 150. Accordingly, the center hole 501 of the disk 500 contacts with each rib 151 respectively and the lower surface of the disk 500 contacts with the flat section 161 of the table 160 evenly.

When the disk 500 is pressed down toward the bottom plate 125 further more, the force "P" is applied to the non supported section 164 by way of the disk 500. As shown in FIG. 14, the non supported section 164 is elastically deformed downward to the bottom plate 125. A force "S", which makes the disk 500 slide along an upper surface of the lip 143 of the fastening section 140 to the radial direction toward the lip 143 in conjunction with slanting of the non supported section 164 by an elastic deformation, is generated as shown in FIG. 14. The force "S" deforms elastically each rib 151, which is contacted with the disk 500, to a direction "T" shown in FIG. 14 toward the lip 143.

The force "P" pushing down the non supported section 164 is further applied to the table 160 totally and whole the table 160 is elastically deformed downward. Therefore, the cylindrical rib 150, which is provided on the table 160, is elastically deformed downward and each rib 151 is inclined toward the fastening section 140 by a cooperation with the force "S". The disk 500 can move to the direction toward the fastening section 140, so that a distance of overlapping the center hole 501 of the disk 500 with the lip 143 of the fastening section 140 is reduced. Accordingly, the lip 143 can easily pass through the center hole 501 of the disk 500.

By an elastic restoring force of the arm 141, at a moment when deformation of each rib 151 and the arm 141 are proceeded as far as a tip of the lip 143 can pass through the center hole 501 of the disk 500, the tip of the lip 143 slips through the center hole 501 of the disk 500, and then the fastening section 140 returns back to an original posture. If the pressing down force "P" is released at the time when the fastening section 140 returns back to the original posture, each rib 151 and the non supported section 164 return back to an original posture respectively, so that the disk 500 returns back to the center position of the engaging section 130. Accordingly, the disk 500 can be held by both the table 160 and the lip 143.

A cutting off dimension of the wall 162 being apart from the bottom plate 125 by the notch 165 is assigned with considering such that the cutting off dimension shall be enough for the non supported section 165 to be elastically deformed, enough amount of resin flow into the non supported section 164 can be maintained while molding process and a certain connecting distance shall be maintained not so as to occur unnecessary deformation. As shown in FIG. 7, the non supported sections 164a and 164b are provided at the both end of the table 160. The non supported sections 164a and 164b are prolonged from both ends of the table 160 approximately to the grooves 152-1 and 152-5 respectively. The cutting off dimension of the non supported section 164 is provided in consideration of that elastic deformation is stably created in accordance with the grooves 152-1 through 152-5 when a pressing down force is applied to the table 160.

Since a sectional shape of the connecting portion of the non supported section 164 is formed a letter "L", a certain force is necessary for the non supported section 164 to be elastically deformed downward. Accordingly, the disk 500 is hardly released from the engaging section 130 by accidental deformation of the non supported section 164 with a weight of the disk 500 itself while containing the disk 500 in the container 100.

On the other hand, in a case that the disk 500 engaged with and fastened to the engaging section 130 is removed while the disk 500 is contained as shown in FIG. 15, the button shaped section 144 is pressed downward with a pushing down force "R" shown in FIG. 16. The arm 141 swings downward with pivoting a joint section with the bottom plate 125 like a hinge in conjunction with deflection of the arm 141 and a contacting distance between the lip 143 and the disk 500 is decreased. The disk 500 is push out toward the fastening section 140 in a direction "S" shown in FIG. 17 in response to the contacting distance between the lip 143 and the disk 500, and then each rib 151 of the cylindrical rib 150 is deflected toward the center of the engaging section 130 in a direction "T" shown in FIG. 17 in accordance with the movement of the disk 500. The disk 500, which is applied with a downward force through the lip 143, pushes down the non supported section 164, so that whole the table 160 is elastically deformed downward. Accordingly, each rib 151 is more deflected to the direction "T". A degree of elastic deformation of the table 160 including the non supported section 164 is designated sufficiently greater than that of the arm 141, so that the disk 500 never fails to be removed even though the non supported section 143 is push down as same degree as that of the button shaped section 144.

The disk moves horizontally and the tip of the lip 143 slips through the center hole 501 of the disk 500 at a moment when elastic recovering force of the arm 141 exceeds friction between an inner wall of the center hole 501 of the disk 500 and the tip of the lip 143, and then the lip 143 gets into under the disk 500. Accordingly, the disk 500 is released from the engaging section 130. At the same time, a force, which is applied to the rib 151 to deform horizontally, disappears. Further, a force, which is applied to the non supported section 164 to push down, also disappears. Therefore, the rib 151 returns back to an original posture as shown in FIG. 18.

A location of the disk 500 is restricted by the cylindrical rib 150, which is already in the original posture, when the pushing down force "R" is removed, so that the tip of the lip 143 never slips through the center hole 501 of the disk 500 again. The disk 500 is kept stationary on the button shaped section 144 including the inclined plane 145 above the lip 143. Accordingly, the disk 500 is released from the engaging section 130 completely and can be easily taken out by a hand.

Second Embodiment

Main features and configuration of a container described in a second embodiment are approximately equal to those of the first embodiment. Therefore, differences from the first embodiment are described basically in this embodiment.

Figure 2:
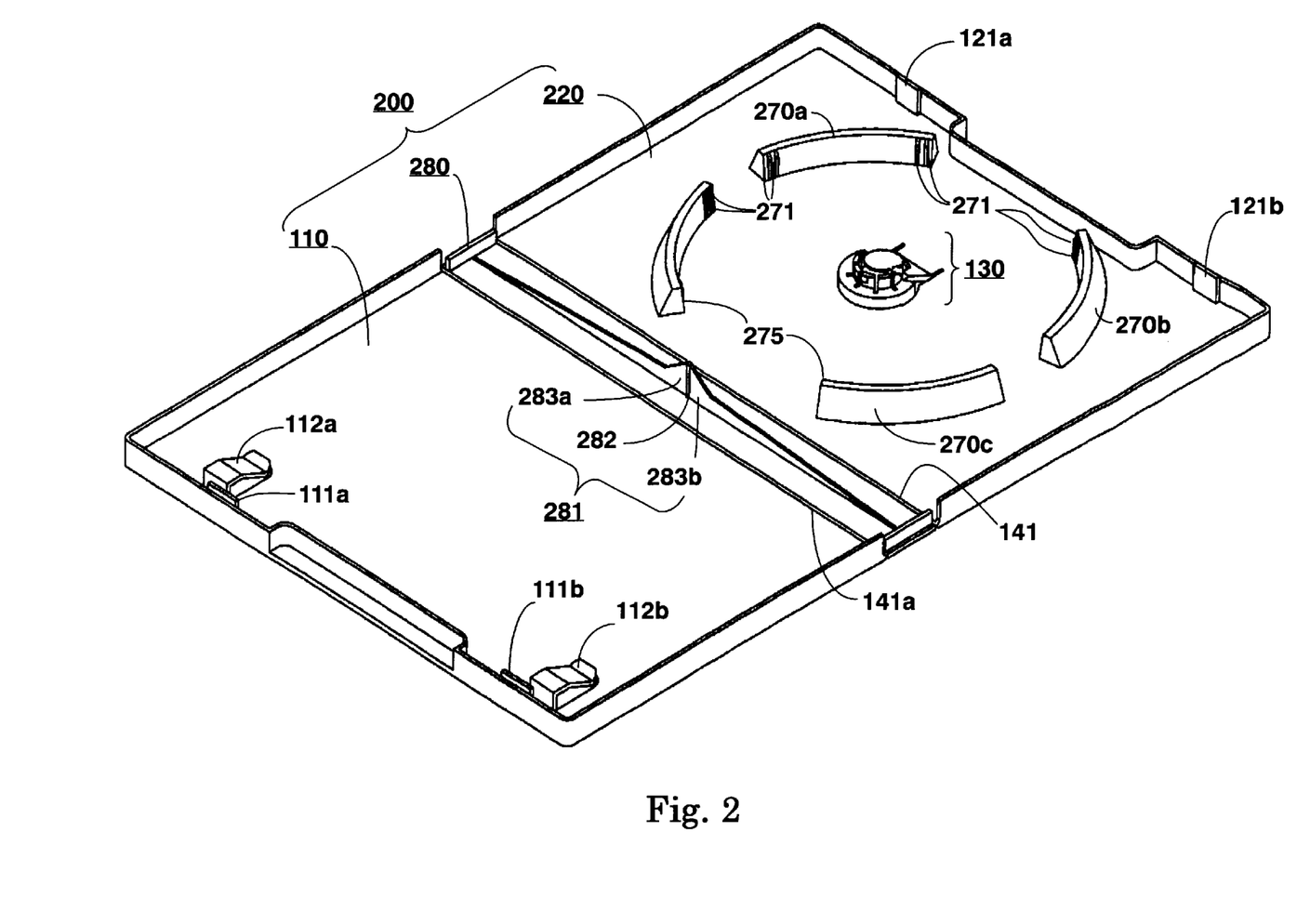
FIG. 2 is a perspective view of a container for a disk with opening the container flat according to a second embodiment of the present invention.

FIG. 2 is a perspective view of a container for a disk with opening the container flat according to a second embodiment of the present invention.

Figure 4:
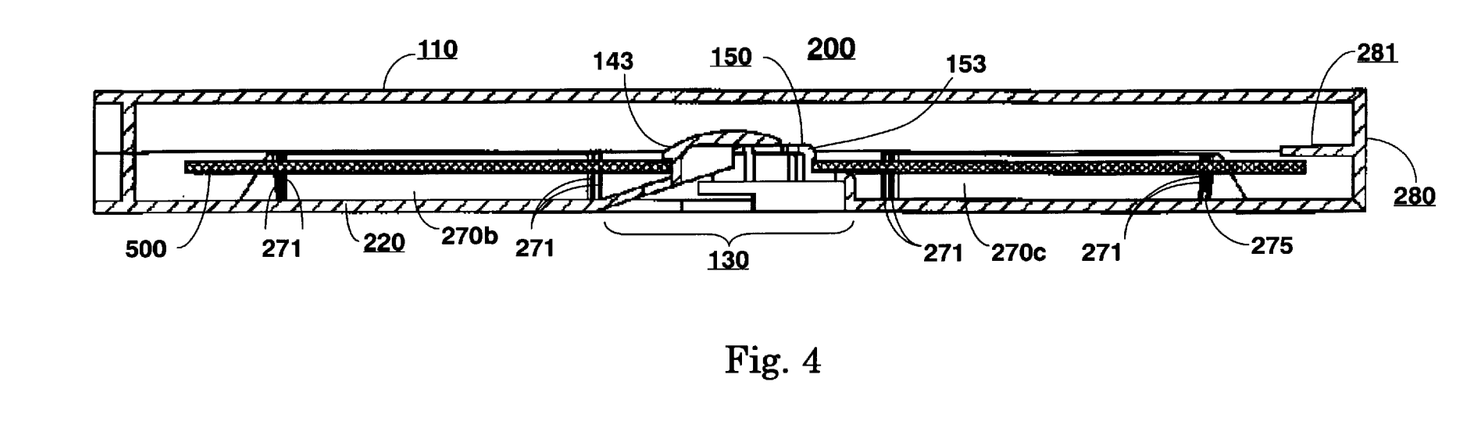
FIG. 4 is a cross sectional view of the container shown in FIG. 2 with containing a disk in it according to the second embodiment of the present invention.

FIG. 4 is a cross sectional view of the container shown in FIG. 2 with containing a disk in it according to the second embodiment of the present invention.

Figure 19:
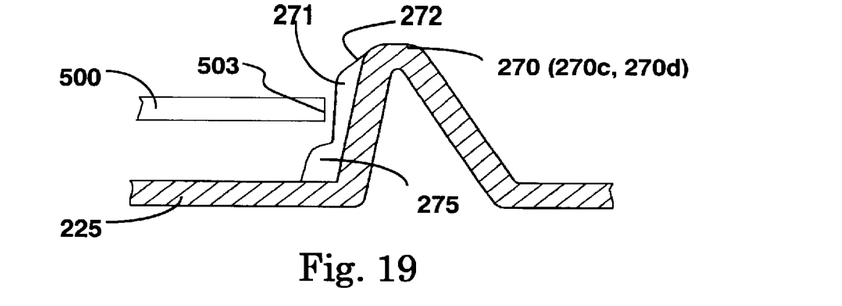
FIG. 19 is an enlarged cross sectional view, a partly schematic, showing relative locations between a disk and an auxiliary rib according to the second embodiment of the present invention.

FIG. 19 is an enlarged cross sectional view, a partly schematic, showing relative locations between a disk and an auxiliary rib according to the second embodiment of the present invention.

Figure 20:
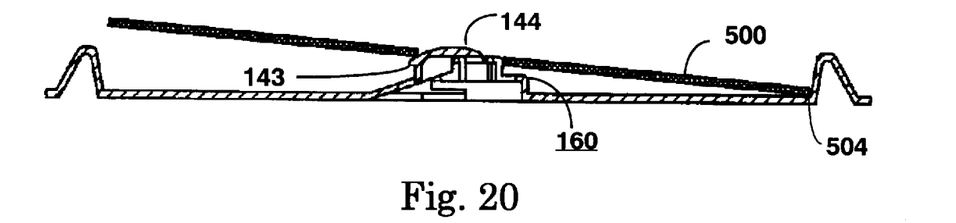
FIG. 20 is a cross sectional view showing a disk slanted when the disk is removed from a container according to the present invention.

FIG. 20 is a cross sectional view showing a disk slanted when the disk is removed from a container according to the present invention.

Figure 21:
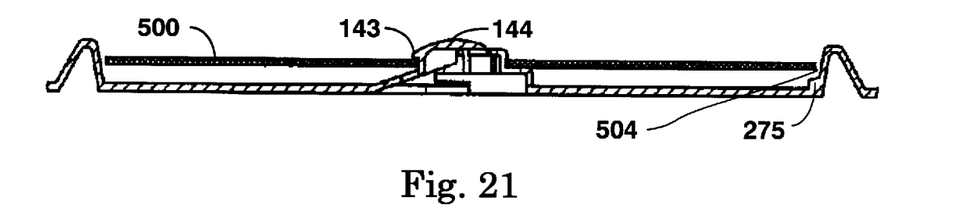
FIG. 21 is a cross sectional view when the disk is loaded completely in the container and engaged with the engaging section according to the second embodiment of the present invention.

FIG. 21 is a cross sectional view when the disk is loaded and engaged with the engaging section completely in the container according to the second embodiment of the present invention.

Figure 22:
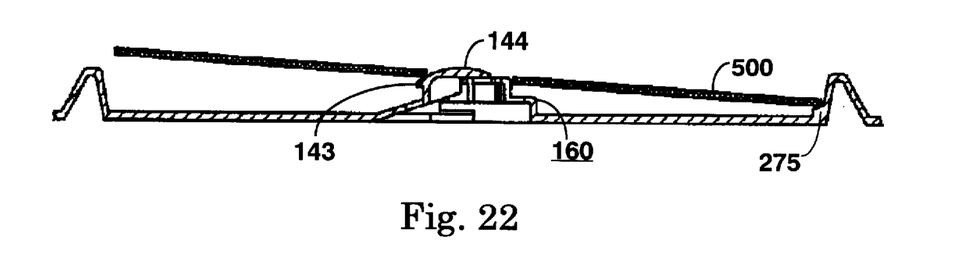
FIG. 22 is a cross sectional view showing a status of reducing inclination of a disk when loading the disk into the container according to the present invention.

FIG. 22 is a cross sectional view showing a status of reducing inclination of a disk when loading the disk into the container according to the second embodiment of the present invention.

Figure 23A:
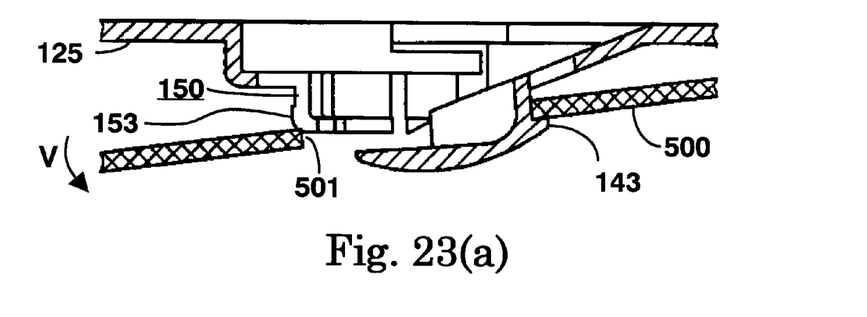
FIGS. 23(a) through 23(c) are cross sectional views, a partly schematic, showing movement of a disk when the container falls down according to the present invention.
Figure 23B:
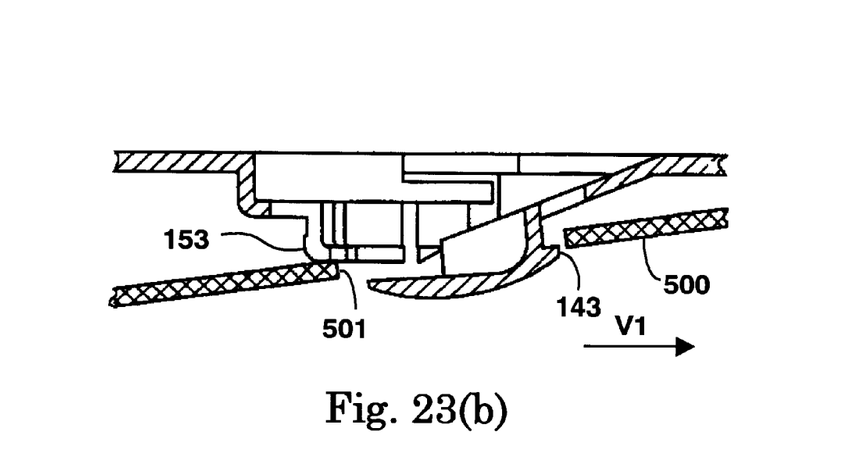
Figure 23C:
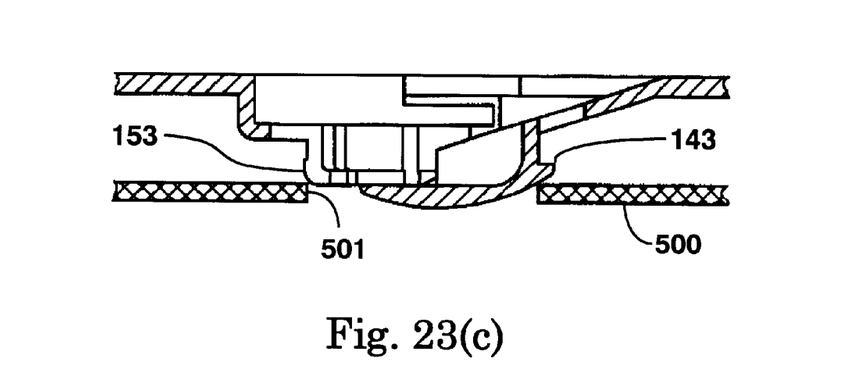

FIGS. 23(a) through 23(c) are cross sectional views, a partly schematic, showing movement of a disk when the container falls down according to the second embodiment of the present invention.

Figure 24:
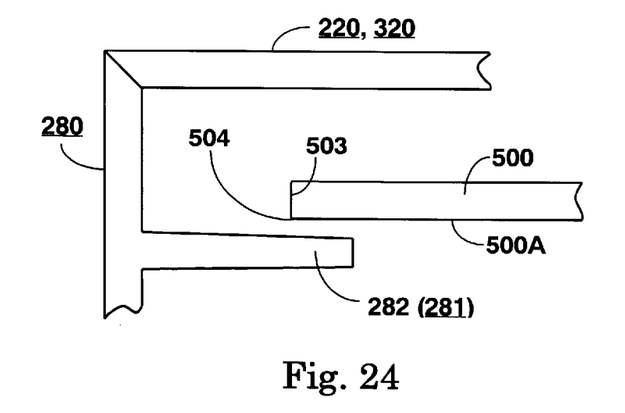
FIG. 24 is an enlarged cross sectional view, a partly schematic, showing relative locations between the tongue shaped projection and a disk in the container according to the second and third embodiments of the present invention.

FIG. 24 is an enlarged cross sectional view, a partly schematic, showing relative locations between the tongue shaped projection and a disk in the container according to the second embodiment of the present invention.

In FIG. 2, a disk container 200 comprises a cover section 110, a tray section 220 and a spine section 280, which joints the cover section 110 and the tray section 220, wherein they are molded in one piece. There provided two hinge sections 141a and 141b on the both side of the spine section 280: one hinge section 141a is connected to the cover section 110 and the other hinge section 141b is connected to the tray section 220. These hinge sections 141a and 141b are bent so as to face the cover section 110 and the tray section 220 each other and they are engaged. Accordingly, one container is formed.

The tray section 220 comprises the engaging section 130 for fastening a disk securely and four disk protection ribs 270a through 270d, hereinafter called a disk protection rib 270, which are allocated in an outermost circumference area of a disk to protect the disk contained in the container 200.

There provided two pairs of auxiliary rib 271 per each disk protection rib 270 being allocated on an inside wall of each disk protection rib 270 at both ends. As mentioned in the first embodiment, each disk protection rib 270 is provided for protecting an outer circumference of a disk from damage when external force is accidentally applied to the disk contained in the container 200 in the radial direction of the disk or when the container 200 containing the disk is accidentally dropped. However, in a case that there existed a gap between the disk fastened to the engaging section 130 and the disk protection rib 270, the disk may slide horizontally. In this case, a center hole of the disk may severely deform main components of the engaging section 130 such as the fastening section 140 and the cylindrical section 150 in response to a horizontal sliding of the disk.

As shown in FIG. 19, in order to decrease the gap between an outer circumference 503 of the disk 500 and the disk protection rib 270, there provided the auxiliary rib 271. A slant 272, which is utilized for introducing the disk 500 in place easily when loading, is provided on the upper end of the auxiliary rib 271. There existed a necessary gap between an outer circumference 503 of the disk 500 and the auxiliary rib 271, so that the disk 500 does not contact with the auxiliary rib 271 while loading and removing the disk 500.

Further, a protrusion 275 is provided at the lower part of the auxiliary rib 271 on the disk protection ribs 270c and 270d respectively. The protrusion 275 is provided for easier removal of the disk 500. In a case that the disk 500 is inclined as shown in FIG. when removing the disk 500, a lower edge 504 of the outer circumference 503 of the disk 500 contacts with a bottom plate 225 of the tray section 220. It is hard to pick up the outer circumference 503 of the disk 500 contacting with the bottom plate 225 by a fingertip. Accordingly, the protrusion 275 is provided for improving the above-mentioned situation.

In FIG. 21, the disk 500 is kept flat with having a clearance between the lower edge 504 of the outer circumference 503 of the disk 500 and the protrusion 275 when the disk 500 is loaded in place completely.

As shown in FIG. 22, since the lower edge 504 of the outer circumference 503 of the disk 500 is supported by the protrusion 275 although the disk 500 is inclined, the disk 500 can be easily removed by a fingertip. In addition thereto, a height of the protrusion 275 is set to lower than that of the table 160, so that the disk 500 does not contact with the protrusion 275 when removing the disk 500. Accordingly, the protrusion 275 will not affect a disk when removing the disk.

As shown in FIG. 2, the spine section 280 is provided with a tongue 281, which is projected so as to prevent a disk from dropping off. When the container 200 is closed while fastening a disk 500 with the engaging section 130, the tongue 281 is allocated at a position neighboring to an upper surface of the disk 500 as shown in FIG. 4.

In order to withstand a shock while the container 200 containing a disk is dropped, it is desirable for the tongue 281 to be composed of a cylindrical pin shaped portion 282 and fin shaped portions 283a and 283b as shown in FIG. 2. The fin shaped portions 283a and 283b are prolonged from both sides of the cylindrical pin shaped portion 282 to both edges of the spine section 280 and are designated to be thinner than a diameter of the cylindrical pin shaped portion 282. A shape of the tongue 281 is formed such that the cylindrical pin shaped portion 282 is a tallest and the fin shaped portions 283a and 283b are gradually decreasing its height toward the edge of the spine section 280. In other words, a relative distance between the tongue 281 and the disk 500 is gradually decreasing toward both ends of the tongue 281. Further, the disk 500 only contacts with the cylindrical pin shaped portion 282 when the disk 500 is slanted.

As shown in FIG. 4, a maximum height of the tongue 281 is designated so as for the tip of the tongue 281 to overlap with the disk 500. Further, it is desirable for the tongue 281 that the tongue 281 is allocated with keeping a small gap between the lower surface of the tongue 281 and the upper surface of the disk 500. In other words, the projection 153 of the cylindrical rib 150 and the lip 143 and the tongue 281 are allocated each other so as for an upper edge of the outer circumference 503 of the disk 500 not to contact with the tongue 281, when the disk 500 held horizontally among them is in a steady state. It is a purpose of eliminating possible deformation of the disk 500 if the disk 500 is stored for a longer period of time with keeping the tongue 281 always contacting with the disk 500.

If the tongue 281 is not provided on the spine section 280, the disk 500 is swung to a direction "V" shown in FIG. 23(a) with centering the lip 143 because the lip 143 holds the disk 500 much stronger than the projection 153 does. The center hole 501 of the disk 500 is released from an engagement with the cylindrical rib 150 as a result of swinging and the disk 500 can move to a direction "V1" shown in FIG. 23(b). Accordingly, the disk 500 is also released from an engagement with the lip 143 as shown in FIG. 23(c). The tongue 281 is provided for a purpose of preventing a disk from dropping off from the engaging section 130 as mentioned above. As shown in FIGS. 23(a) through 23(c), it is necessary for the tongue 281 to be allocated in a right position such that the upper edge of the outer circumference 503 of the disk 500 hits against the tongue 281 before the center hole 501 of the disk 500 runs up on the projection 153 of the cylindrical rib 150 as a result of the swinging motion.

When the disk 500, which is applied with a shock by dropping, starts to swing with pivoting the lip 143 as shown in FIGS. 23(a) through 23(c), the upper edge of the outer circumference 503 of the disk 500 contacts with the cylindrical pin shaped portion 282 of the tongue 281 and the disk 500 is stopped swinging before the center hole 501 of the disk 500 is released from the projection 153 of the cylindrical rib 150. Therefore, the center hole 501 of the disk 500 can not slip out from the projection 153 of the cylindrical rib 150. Accordingly, the disk 500 will not released from the engaging section 130 by a shock caused of dropping.

The tongue 281 is required to fulfill the above mentioned functions, so that the cylindrical pin shaped portion 282 is not necessary to contact with the disk 500 always. Accordingly, it is proper for the tongue 281 to prevent the disk 500 from swinging over the projection 153 of the cylindrical rib 150 by a shock caused of dropping. It is desirable for the tongue 281 to be allocated such that a clearance between the cylindrical pin shaped portion 282 of the tongue 281 and the lower surface 500A of the disk 500 is gradually increasing toward the tip of the cylindrical pin shaped portion 282 as shown in FIG. 24. By this configuration, the lower edge 504 of the outer circumference 503 of the disk 500 only hits against the cylindrical pin shaped portion 282 when the disk swings and contacts with the tongue 281. Accordingly, recorded signals recorded on an inner circumference area are not affected by a shock caused of dropping.

Third Embodiment

Major difference between a container described in a third embodiment and the container of the second embodiment is a construction of a tray section. Therefore, differences from the second embodiment are basically described in this embodiment.

Figure 3:
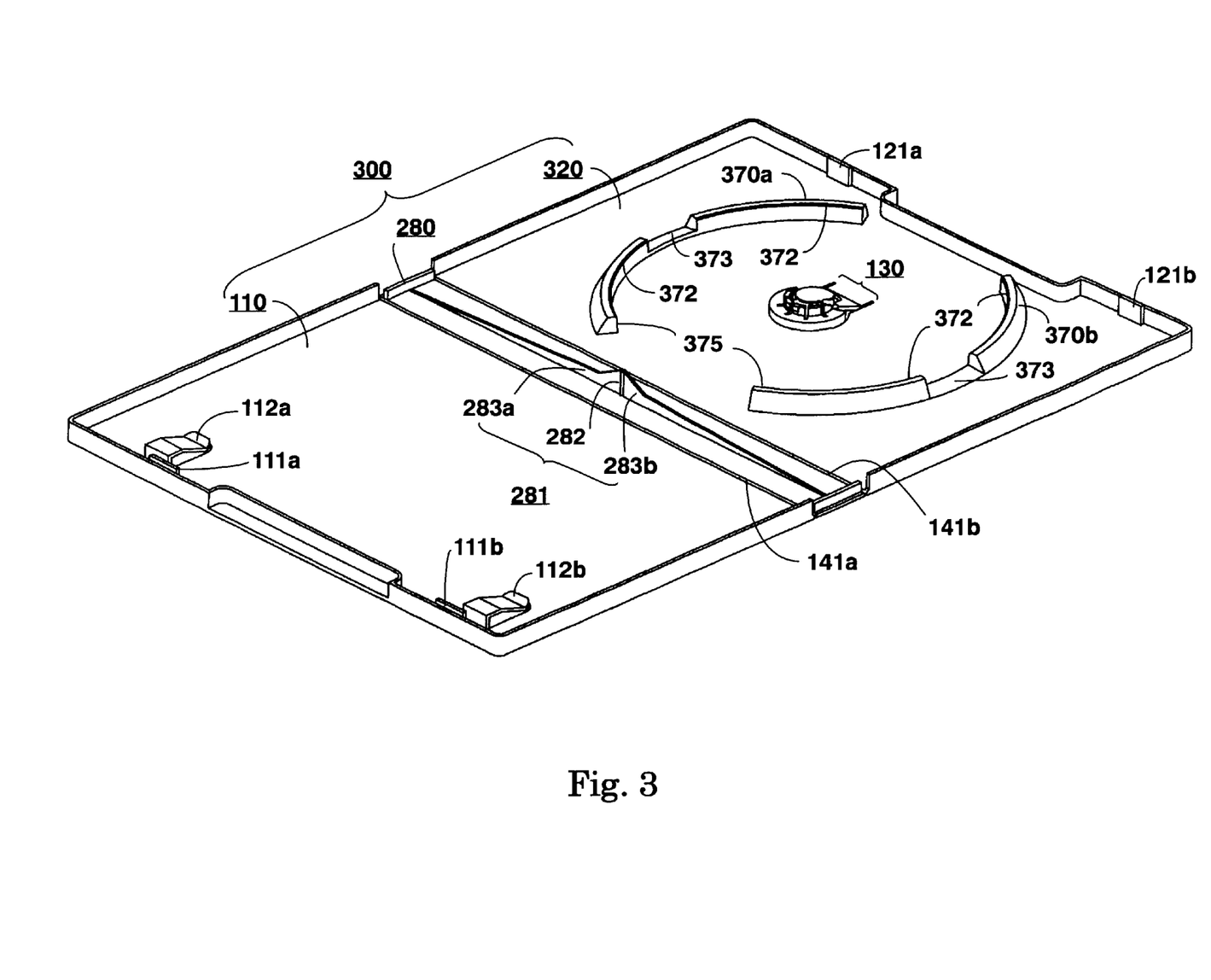
FIG. 3 is a perspective view of a container for a disk with opening the container flat according to a third embodiment of the present invention.

FIG. 3 is a perspective view of a container for a disk with opening the container flat according to a third embodiment of the present invention.

Figure 5:
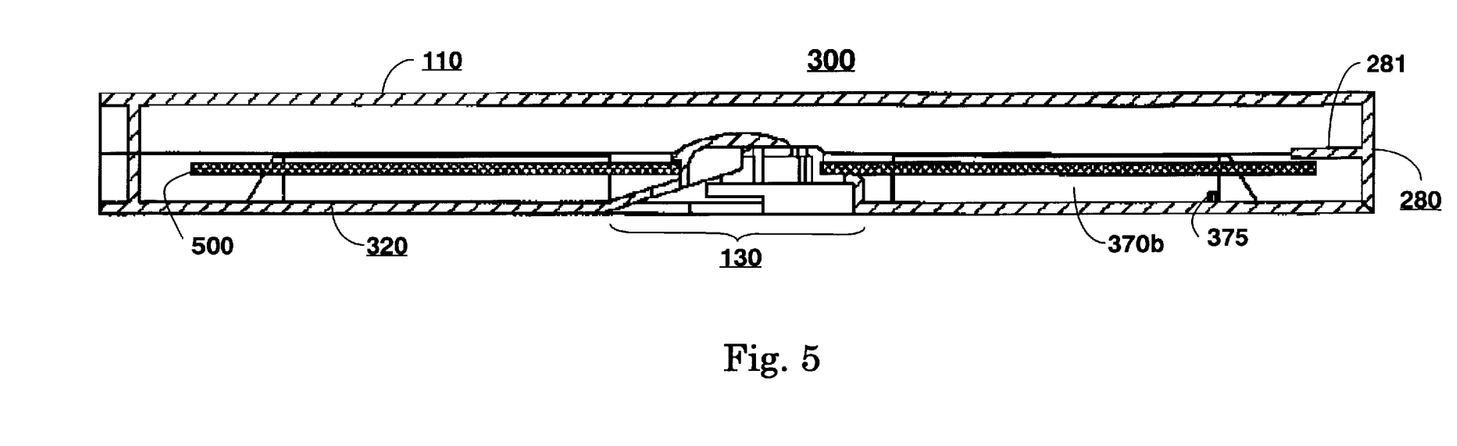
FIG. 5 is a cross sectional view of the container shown in FIG. 3 with containing a disk in it according to the third embodiment of the present invention.

FIG. 5 is a cross sectional view of the container shown in FIG. 3 with containing a disk in it according to the third embodiment of the present invention.

In FIG. 3, a disk container 300 comprises a cover section 110, a tray section 320 and a spine section 280, which connects the cover section 110 and the tray section 320, wherein they are molded in one piece.

Constructions and functions of the cover section 110 are the same as those of the first embodiment of the present invention, so that they are not depicted in this embodiment.

The tray section 320 comprises two snap hooks 121a and 121b, the engaging section 130 for fastening a disk securely and two disk protection ribs 370a and 370b. The disk protection ribs 370a and 370b are allocated in an outermost circumference area of a disk to protect the disk contained in the container 300.

The disk protection ribs 370a and 370b are constructed such that a joint rib 373 connects a space between two disk protection ribs disclosed in the second embodiment adjacent to each other. In other words, each space allocated in between two pairs of the disk protection ribs 270a–270d and 270b–270c, which are provided in the container 200 of the second embodiment shown in FIG. 2, is connected by the joint rib 373 respectively. Further, a modeling having a same sectional shape as the auxiliary rib 271 shown in FIG. 19 is provided all around the inner wall of respective disk protection ribs 370a and 370b except an area of the joint rib 373. However, in the case of the second embodiment, the auxiliary rib 271 is only provided intermittently at both ends of respective disk protection ribs 271a through 271d. Furthermore, a slant section 372 is provided on a top portion of the modeling as same as the slant 272 as shown in FIG. 19. Accordingly, the inner wall of the disk protection ribs 371a and 371b approaches the outer circumference 503 of the disk 500 by an external form of the modeling.

The disk protection ribs 370a and 370b can also obtain a similar effect to the effect obtained by the disk protection ribs of the second embodiment. One each protrusion 375 is provided on the disk protection ribs 370a and 370b respectively as same as the protrusion 275 is provided on the disk protection ribs of the second embodiment.

The container 300 is constructed a same as the container 200 of the second embodiment. A tongue 281 is also provided on the spine section 280 as same as that of the second embodiment.

Functions and effects of the tongue 281 are a same as those of the second embodiment, so that details of them are abbreviated.

While the invention has been described above with reference to specific embodiment thereof, it is apparent that many changes, modifications and variations in the arrangement of equipment and devices and in materials can be made without departing from the invention concept disclosed herein. For example, the same function as the tongue 281 can be obtained by other shape than the shape of the cylindrical pin shaped rib 282 of the tongue 281.

Figure 25:
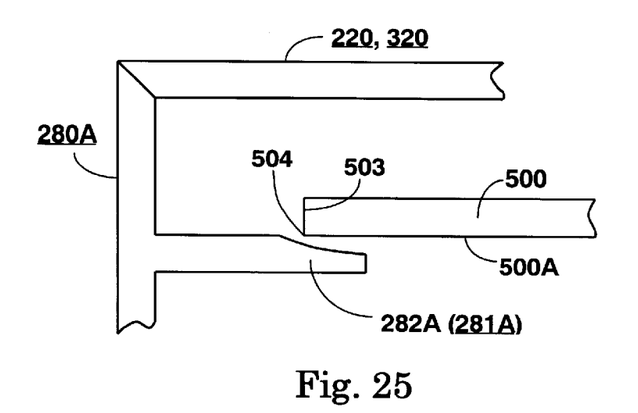
FIG. 25 is an enlarged cross sectional view, a partly schematic, showing one example of a tongue shaped projection according to the present invention.

FIG. 25 is an enlarged cross sectional view, a partly schematic, showing one example of a tongue shaped projection according to the present invention.

Figure 26:
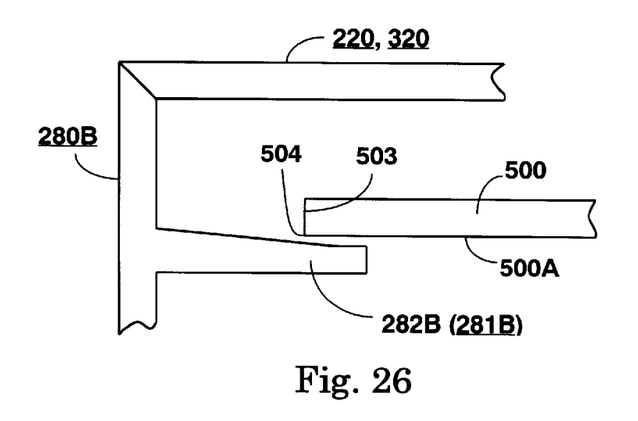
FIG. 26 is an enlarged cross sectional view, a partly schematic, showing another example of a tongue shaped projection according to the present invention.

FIG. 26 is an enlarged cross sectional view, a partly schematic, showing another example of a tongue shaped projection according to the present invention.

In FIG. 25, a tip of a cylindrical pin shaped rib 282A of a tongue 281A, which is provided on a spine section 280A, is cut off in a circular arc. In FIG. 26, a tip of a cylindrical pin shaped rib 282B of a tongue 281B, which is provided on a spine section 280B, has a combination surface of liner and slant. The lower edge 504 of the outer circumference 503 of the disk 500 contacts with either cylindrical pin shaped rib 282A or 282B.

According to an aspect of the present invention, there provided a container for a disk comprising a spine section of which both side are provided with a cover section and a tray section being able to be opened and closed freely, wherein the tray section is provided with an engaging section for engaging with a center hole of a disk to be contained in the container. Further, the engaging section comprises a "C" shaped table and a cylindrical rib and a fastening section, which is composed of a lip and a button shaped section and an arm. While removing the disk, the cylindrical rib can easily be elastically deformed inward toward a center of an arc formed by the cylindrical rib and the disk can easily slide to the lip direction, so that stress applied to the disk is released and the lip can easily slip through a center hole of the disk. Furthermore, since the "C" shaped table is provided, the disk is securely held at an innermost circumference area of the disk. Moreover, a non supported section having a notch is provided, the lip can easily slip through the center hole of the disk while the cylindrical rib is elastically deformed. In addition thereto, a height of the cylindrical rib is higher than a height of the button shaped section at a time when engagement between the button shaped section and the disk is released, so that the disk is hardly released from the engagement by accidental pressure applied to the cover section of the container. Accordingly, the disk can be held securely by the engaging section and removed easily.

According to another aspect of the present invention, there provided a container for a disk comprising a spine section, a cover section and a tray section, wherein the cover section and the tray section are provided on both sides of the spine section so as to be able to be closed and opened freely, and wherein the tray section is provided with an engaging section for engaging with a center hole of a disk to be contained in the container. The spine section is further provided with a tongue shaped section, which is projected vertically on the spine section and allocated so as to approach an upper surface of the disk contained in the container with being fastened by the engaging section. Accordingly, the disk can be held securely by the engaging section and removed easily. Further, the disk is prevented from being released from the engaging section by a shock caused by accidentally dropping of the container containing the disk engaged with the engaging section because the tongue shaped section restricts the upper surface of the disk to moving its allocation and prevents the disk from being released from the engaging section.

What is claimed is:

1. A container for a disk comprising:

a spine section;

a cover section provided on one side of said spine section so as to be able to be closed and opened freely; and a tray section provided on another side of said spine section so as to be able to be closed and opened freely, wherein said tray section is provided with an engaging section for engaging with a center hole of a disk, and wherein said engaging section engages with and holds the disk so as to load and release the disk freely, said engaging section further comprising:

a C-shaped table portion for supporting the disk in a predetermined height;

a cylindrical rib composed of a plurality of ribs provided on the C-shaped table portion with respectively contacting with an inner wall of a center hole of the disk supported by the C-shaped table portion; and a fastening section composed of a lip shaped portion, which presses down and fastens the disk supported by said C-shaped table portion after the lip shaped portion passes through the center hole of the disk, a push button shaped portion of releasing the disk from an engagement with said lip shaped portion pressing down and fastening the disk and an arm portion having elasticity, which is provided on said tray section.

2. A container for a disk comprising:

a spine section;

a cover section provided on one side of said spine section so as to be able to be closed and opened freely; and a tray section provided on another side of said spine section so as to be able to be closed and opened freely, wherein said tray section is provided with an engaging section for engaging with a center hole of a disk, and wherein said engaging section engages with and holds the disk so as to load and release the disk freely, said engaging section further comprising:

a C-shaped table portion for supporting the disk in a predetermined height;

a cylindrical rib composed of a plurality of ribs provided on the C-shaped table portion with respectively contacting with an inner wall of a center hole of the disk supported by the C-shaped table portion; and a fastening section composed of a lip shaped portion, which presses down and fastens the disk supported by said C-shaped table portion after the lip shaped portion passes through the center hole of the disk, a push button shaped portion of releasing the disk from an engagement with said lip shaped portion pressing down and fastening the disk and an arm portion having elasticity, which is provided on said tray section, and said spine section further comprising a tongue shaped section for protecting the disk from accidentally dropping off, which is projected on said spine section with allocating so as to approach an upper surface of the disk when said container is closed after the disk is engaged with said engaging section, and said engaging section is further characterized by that said engaging section is formed so as for said tongue shaped section and said C-shaped table portion to face each other.

3. The container for a disk in accordance with claim 2, wherein said tongue shaped section is further characterized by a shape such that a distance between said tongue shaped section and the upper surface of the disk is gradually increasing toward a tip of said tongue shaped section.

\* \* \* \* \*